Jan. 10, 1933.  W. E. MASTERSON ET AL  1,893,629
ELECTRIC MOTOR
Filed June 1, 1931  3 Sheets-Sheet 1

Inventors
William E. Masterson,
Henry Price.
By A. J. O'Brien
Attorney

Jan. 10, 1933. W. E. MASTERSON ET AL 1,893,629

ELECTRIC MOTOR

Filed June 1, 1931  3 Sheets-Sheet 2

Inventors
William E. Masterson,
Henry Price.
By A. J. O'Brien
Attorney

Patented Jan. 10, 1933

1,893,629

UNITED STATES PATENT OFFICE

WILLIAM E. MASTERSON AND HENRY PRICE, OF BORGER, TEXAS, ASSIGNORS OF ONE-THIRD TO HARRY R. ROGERS, OF DENVER, COLORADO

ELECTRIC MOTOR

Application filed June 1, 1931. Serial No. 541,412.

This invention relates to improvements in motor generators and has reference to a motor generator set especially designed for compactness and high efficiency.

It is the object of this invention to produce a motor generator of a substantial construction and neat design that shall be compact and arranged in such a way that the maximum efficiency and capacity will be obtained with a minimum size and weight.

This invention, briefly described, consists in an elongated tubular generator field frame to the inside of which a plurality of field magnets are connected. A motor field frame of a similar construction is located within the generator field frame and has its outer surface spaced from the inner surface of the generator field magnets so as to provide an annular cylindrical space in which the generator armature is rotatably mounted. Located within the motor field frame is a cylindrical armature having a plurality of magnets or pole pieces arranged helically about its surface. Means is provided for energizing the motor field magnets successively in such a way that a uniform torque is produced which tends to rotate the motor armature. The motor armature and the generator armature are interconnected by a mechanism that will produce simultaneous rotation of the two armatures. When current is supplied to the motor the latter will rotate and impart rotation to the generator armature whereupon the generator will function and produce current of the desired voltage which can be employed for any purpose.

Having thus briefly described the invention, the same will now be described in detail and for this purpose reference will be had to the accompanying drawings in which the preferred embodiment of the invention has been illustrated, and in which.

Figure 2:
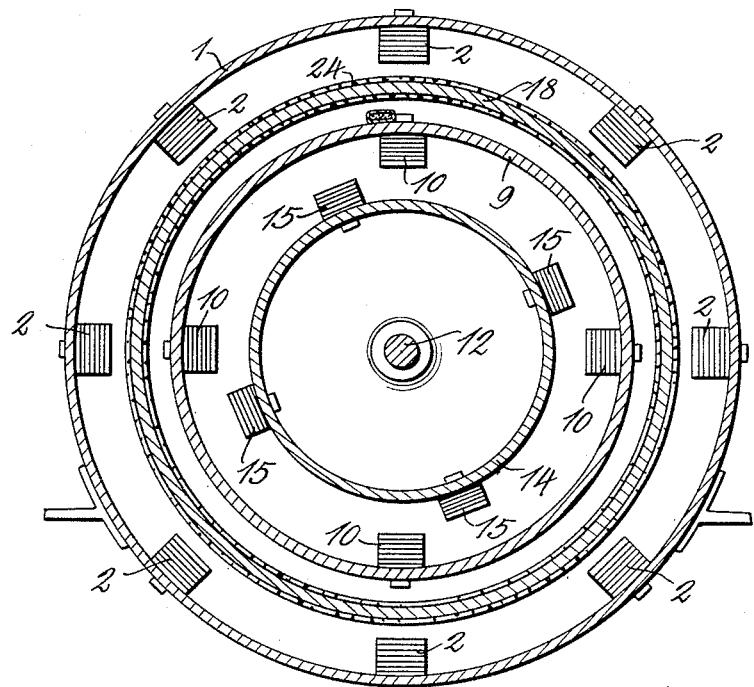
Fig. 2 is a transverse section taken on line 2—2, Fig. 1.
Figure 3:
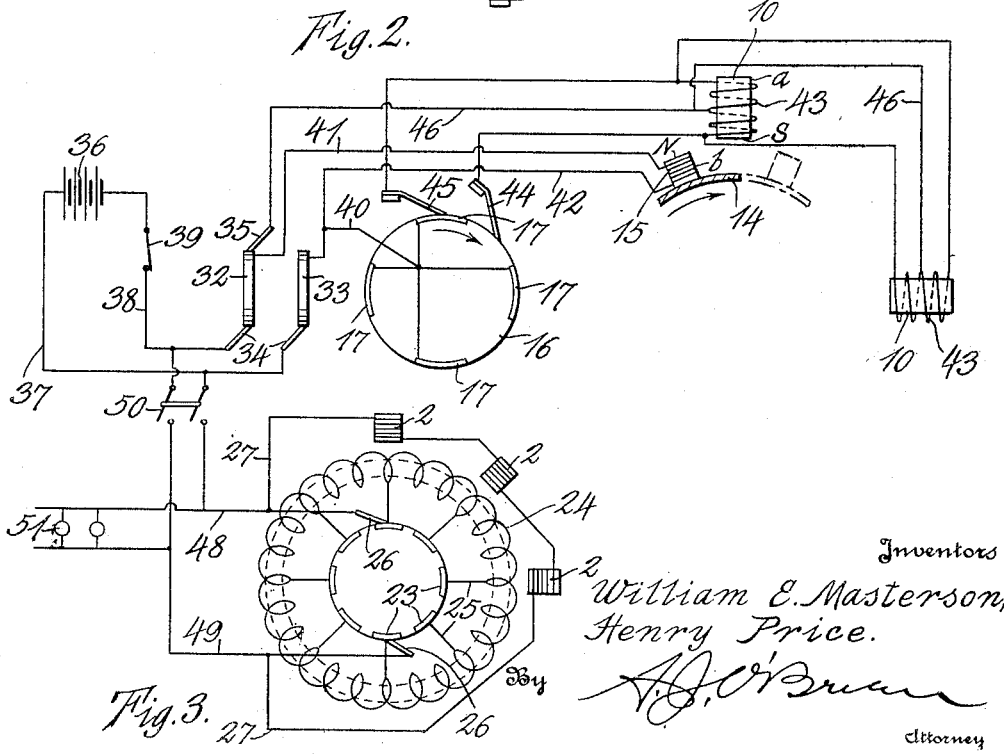
Fig. 3 is a diagram showing the different wiring connections and the relationship of the several elements.
Figure 4:
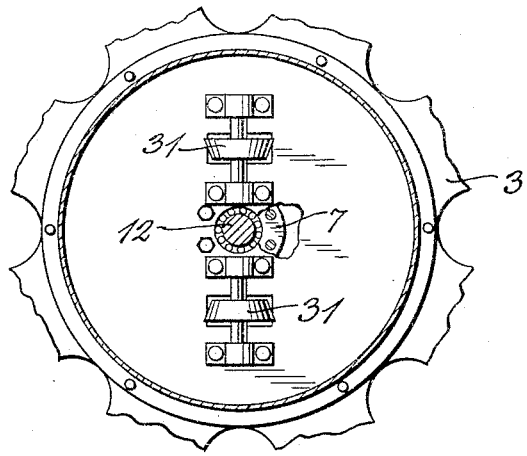
Fig. 4 is a section taken on line 4—4, Fig. 1.

In the drawings reference numeral 1 represents a generator field frame which may be made of soft iron and which is preferably cylindrical in shape. Secured to the inner surface of this frame are a number of rows of electromagnets 2. The number of magnets in each row is immaterial within reasonable limits, but in the example illustrated ten electromagnets have been shown in each row and eight rows of electromagnets have been provided as shown in Fig. 2. The ends of the frame 1 are closed by means of end pieces or plates 3 and 4. These pieces or plates are provided with openings 5 that permit air to circulate through the interior of the field frame. The end plates are provided with openings 6 and secured to the inside of each end plate is a hub 7, the inner end of which has a circular plate 8. A cylindrical motor field frame 9 is connected with the plates 8 and this is provided on its inner surface with a number of rows of electromagnets 10. In the drawings the number of magnets in each row has been shown as ten, but any other number may be used. Hubs 7 are provided with tubular bearings 11 through which the motor armature shaft 12 extends. This shaft is separated from the bearing by means of rollers 13. Secured to the shaft 12 is a cylindrical armature that has been indicated by reference numeral 14. This armature may be a hollow metal cylinder like that indicated by reference numeral 14, or it may be made of solid material as may be found to be most desirable. Secured to the outer surface of armature 14 are several rows of electromagnets or pole pieces 15. The number of rows of magnets 15 must correspond to the number of rows of electromagnets 10 and in the drawings four rows of each have been shown. Where four rows of electromagnets 15 are used, they are arranged along helical lines that extend ninety degrees about the armature in the manner shown quite clearly in Fig. 1. The armature is provided at one end with a commutator 16 having a plurality of commutator segments 17 to which reference will be made hereinafter. The electromagnets on the frame member 9 and those on the armature 14 are arranged in the same diametrical planes so that each magnet 15 will pass each of the four magnets 10 of the field each revolution of the armature. In the embodiment shown there are ten magnets in each of the motor field rows and ten in each of the rows on the armatures. Since the rows of magnets secured to the motor field extend parallel with the axis while those that are secured to the armatures extend helically, it is evident that the armature magnets will successively approach the field magnets and successively recede from them and therefore if magnet $a$ of the field is energized, it will attract the armature magnet $b$ that is nearest to it and this will produce a torque that will cause the armature to rotate until magnet $b$ comes in line with magnet $a$. Magnets 15 are energized so that their outer ends are always of the same polarity and in the drawings they have been indicated as north poles and therefore magnets 10 must be energized so that their inner ends will be south pole. Since unlike poles attract each other and like poles repel, it is evident that after magnet $b$ has been moved into alignment with magnet $a$, the polarity of magnet $a$ will either have to be reversed so as to make its inner end a north pole, or else both will have to be de-energized. By reversing the magnetism of each of the magnets 10 when the magnets 15 pass by, it is possible to take advantage not only of the attraction between opposite poles but also of the repulsion between similar poles and in this way a greater amount of power will be obtained from the same motor. In Fig. 3 magnet $b$ has been shown in full lines in the position where it is when magnet $a$ is energized so as to attract it, and the dotted line position shows the position of magnet $b$ after it has been repelled by the magnet $a$ whose polarity is reversed as magnet $b$ passes by it, all as will hereinafter more fully appear.

The generator field frame is provided with eight rows of electromagnets 2, although any other suitable number of rows may be employed. The generator armature 18 is preferably formed from a cylindrical member of electromagnetic material, such as soft iron and has secured to its ends disks 19 whose inner ends are provided with hubs 20. Interposed between the hubs 20 and the outer surfaces of hubs 7 are rollers 21. Secured to one of the hubs 20 is a ring 22 of insulating material to which the commutator segments 23 are connected. The winding on the armature of the generator has been shown as of the Gramme ring type and has been designated by reference numeral 24. The winding is connected with the commutator segments at equally spaced intervals by means of wires 25. Brushes 26 are connected with the armature in the well known manner and extending from the brushes to the field magnets 2 are conductors 27 that conduct the field current from the generator commutator to the field coils. The theory of operation of the generator will not be described herein because it is merely the old and well known Gramme type generator.

For the purpose of interconnecting the motor and the generator armatures, one end of shaft 12 has been provided with a bevelled gear 28 and the end plate 19 has a bevelled surface 29 of the same diameter and inclination as the bevelled surface 30 on gear 28. Pinions 31 are located between the two bevelled surfaces 29 and 30. The gear may be a friction gear or an ordinary gear as may be desired. It is evident that with the gear arrangement shown the armatures of the motor and generator will rotate in opposite directions and at the same speed.

Referring now more particularly to Fig. 3 where the different parts have been shown in a diagrammatic manner and where the wiring has been indicated, reference numerals 32 and 33 indicate slip rings carried by the motor's armature. Associated with these rings are two sets of brushes that have been designated by reference numerals 34 and 35. Brushes 34 are connected to a source of electric energy such as a battery 36 by means of conductors 37 and 38. Conductor 38 is provided with a switch 39. The commutator segments 17 are all connected with ring 33 by means of a conductor 40. The electromagnets 15 are connected across rings 32 and 33 by conductors 41 and 42, and are therefore energized constantly and in the same direction. Each of the electromagnets 10 are provided with a winding 43. The two ends of this winding are each connected with one of the brushes 44 and 45. The center points of windings 43 are connected to a ring 32 by means of a conductor 46. The two sets of brushes 44 and 45 are angularly spaced and are separated by an arc of substantially 45 degrees. The commutator segments 17 also subtend an arc of substantially 45 degrees. If we now assume that the armature of the motor rotates in a clockwise direction, it will be seen that electromagnets 10 are first energized by that portion of coil 43 that is connected between brush 45 and conductor 46 and this results in the lower ends of the magnets being south poles. After the parts have rotated to such an extent that magnets $b$ come into axial alignments with magnets $a$, brush 45 will pass from the commutator segment and this will move into contact with brush 43, thereby reversing the magnetism of magnet 10 and making the lower end thereof a north pole. Since like poles repel each other, there will be a repulsion between magnets *a* and *b* as the latter is moving away from the former. By reversing the magnetism in magnets 10 a greater amount of power is obtained from the same machine because the repulsive action between the magnets is taken advantage of, whereas, if the magnetism in magnets 10 were not reversed, these magnets would have to be deenergized, as well as magnets *b* because if either of these magnets remain magnetized, a force would be produced that would tend to prevent magnets *b* from moving away from magnets *a*.

The leads or conductors from the generator have been designated by reference numerals 48 and 49 and these can be connected to the motor leads 37 and 38 by means of a switch 50.

Bearing in mind that the armatures of the generator and motor are interconnected so that they both rotate at the same speed, let us now assume that the parts are at rest and that switch 39 is closed. This will permit current to flow to the slip rings 32 and 33 and to magnets 15 which become energized in the manner above explained. Current will also flow to the magnets 10 that are nearest to the commutator or to any other set of magnets that may be connected in circuit at that particular instant. When the magnet 10 shown in Fig. 3 is energized, the lower end will be the south pole and this will attract the magnet *b* as above explained, and the motor armature will be set in motion which will also cause the generator armature to rotate. After the speed has been brought up high enough the generator will start functioning and will deliver current of any desired voltage to wires 48 and 49. This current may be used for any purpose. When a load like that indicated by reference numeral 51 is connected to the generator circuit, sufficient power must be applied to the motor to generate the current necessary for the load 51. Where the device is to be used to produce mechanical power, a pulley or other energy transmitting mechanism 52 is applied to shaft 12 and power can then be taken from this shaft for any purpose desired.

Figure 5:
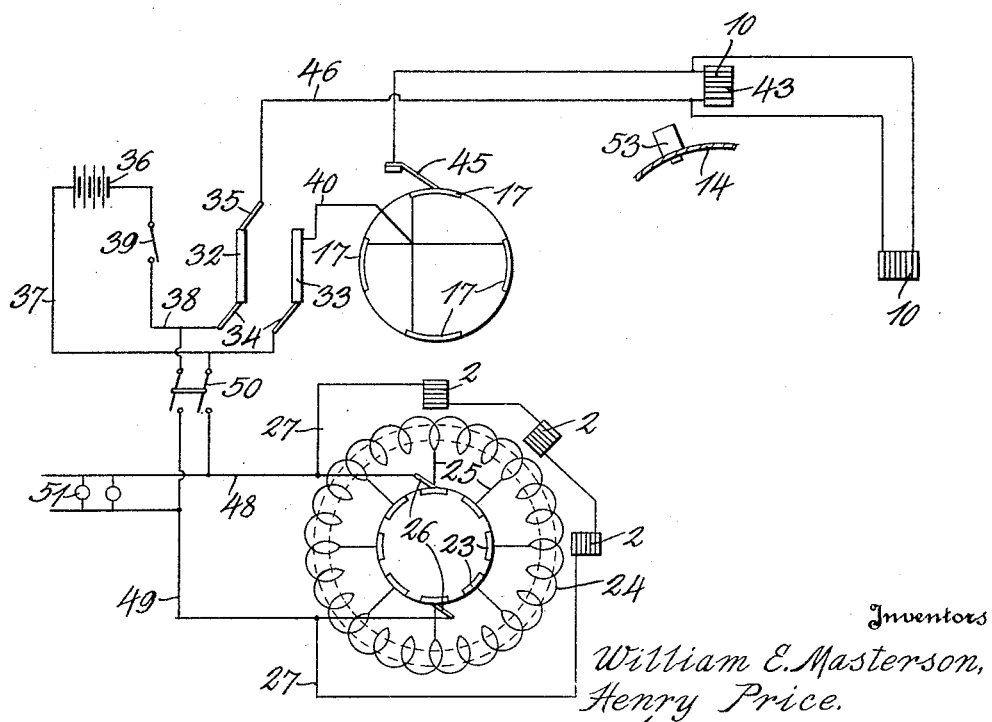
Fig. 5 is a diagram similar to that shown in Fig. 3 but in which a slightly different form of motor is employed.

In Fig. 3 an arrangement has been shown in which advantages are taken of the repulsive effect of magnets of the same polarity and this is the preferred arrangement. It is however, practical to dispense with the repulsive effect and when this is to be done, magnets 15 are replaced by soft iron armatures 53, and the conductor 46 is dispensed with as is also the brushes 44. With the arrangement shown in Fig. 5, electromagnets 10 attract armatures 53 and when the armatures come into alignment with the magnet the latter are deenergized and another set are energized and in this way a continuous torque is obtained just like the arrangement shown in Fig. 3 except that the attraction between the magnets 10 and the armatures 53 are depended on entirely for producing the torque. It is evident that the arrangement shown in Fig. 5 will not produce the same amount of power as the device shown in Fig. 3, but on the other hand it can be more cheaply made and where the initial cost is a consideration, the arrangement shown in Fig. 5 may be used.

Figure 1:
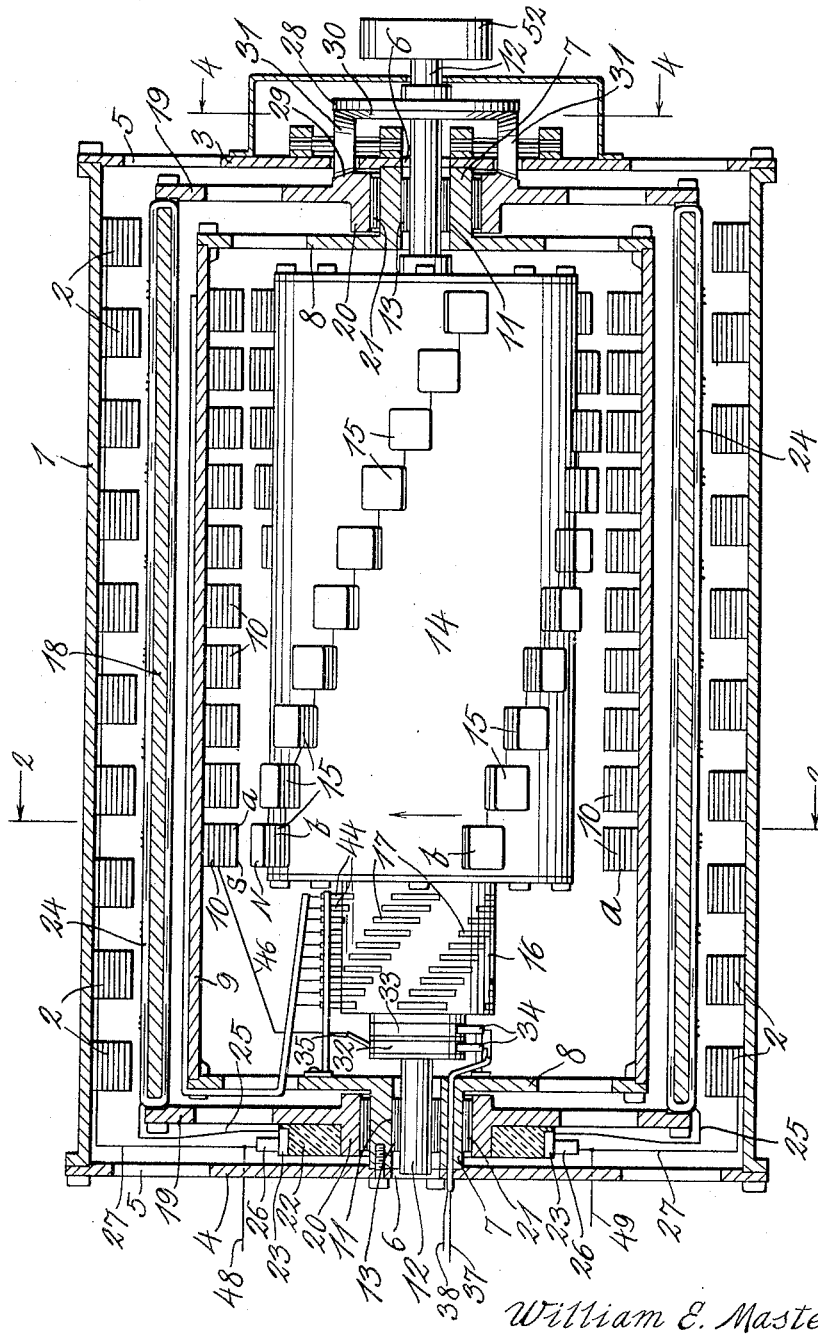
Fig. 1 is a longitudinal diametrical section through the improved motor generator.

It will be apparent from the drawings and the above description that the motor is formed from a large number of sets of electromagnets 10 and 15 and that the magnets that are located in the same transverse plane are energized at the same time and in considering Fig. 1, the magnets nearest the commutator are first energized and their action rotates the armature through an arc of nine degrees, after which the first set of magnets are energized and the second set deenergized. As the armature rotates, the successive energization of magnets 10 produces a constant torque that causes the parts to rotate.

The motor generator described and claimed herein is provided with suitable means for moving the brushes so as to get the proper brush adjustment for the various conditions of speed and load, but since it is customary to provide means for setting the brushes, this means has not been illustrated on the drawings.

From the above description it will be apparent that the invention described herein and shown on the drawings is compact and simple and that by means of it a very efficient motor generator is produced that requires only a small amount of space per unit capacity and which takes advantage of the repulsive action of the electromagnets as well as of their attraction, and therefore requires less weight per unit capacity.

Having described the invention what is claimed as new is:

1. A motor generator comprising, in combination, an elongated stationary cylindrical generator field frame, a stationary elongated cylindrical motor field frame located within the generator field frame, tubular cylindrical connectors between the frames and concentrically located with respect to the frames, a cylindrical generator armature surrounding the motor field and mounted for rotation about the tubular connectors, a motor armature located in the motor field frame, and provided with a shaft whose ends extend through the tubular connectors which form bearing supports for the shaft, and mechanical means for interconnecting the two armatures so that they will rotate simultaneously and in opposite directions whenever one is rotated.

2. A motor generator comprising, in combination, an elongated cylindrical stationary generator field frame, a stationary elongated cylindrical motor field frame located within the generator field, the outer surface of the motor field being spaced a short distance from the inner surface of the generator field so as to provide a cylindrical space between the two, tubular axially located connectors between the two field frames, a cylindrical generator armature located in the space between the two fields, said armature being journaled on the tubular connectors, a cylindrical motor armature located within the motor field the motor armature having a shaft journaled in the tubular connectors, the two armatures being relatively movable with respect to each other and with respect to the two fields, a bevel gear connected to the motor armature, another bevel gear connected to the generator armature, and pinions located between the two gears and meshing with both, said pinions being secured to a stationary portion of the generator field frame whereby the two armatures will be caused to rotate in opposite directions and at equal speeds.

3. A motor generator comprising, in combination, an elongated cylindrical generator field frame, end members secured thereto, the end members having openings concentric with the generator field frame, an elongated cylindrical motor field frame located within the generator field frame and spaced from the inner surface thereof so as to provide an annular space, end members secured to the ends of the motor field frame, said last named end members having each a central hollow hub extending outwardly, the ends of the hubs contacting with the inside of the end members attached to the generator field frame, a cylindrical generator armature located in the space between the two field frames, end members secured to the ends of the generator armature, the last named end members having central bearings journaled on the hubs, a cylindrical motor armature located within the motor field frame, an armature shaft concentric with the motor armature, the ends of the shaft being journaled in the hubs, one of the end members attached to the generator armature having a bevel gear concentric with the motor armature shaft, a similar bevel gear secured to the motor armature shaft at the outside of one generator field frame end member and a plurality of pinions carried by the generator field frame end member and in mesh with both bevel gears whereby a differential gear mechanism is obtained that will produce simultaneous rotation of the generator and motor armatures in opposite directions while the respective field frames remain stationary.

In testimony whereof we affix our signatures.

WILLIAM E. MASTERSON.
HENRY PRICE.